Dec. 29, 1931.  T. A. MITCHELL  1,838,857
METHOD OF OBTAINING ZINC SULPHIDE FROM ITS ORE
Filed April 6, 1927
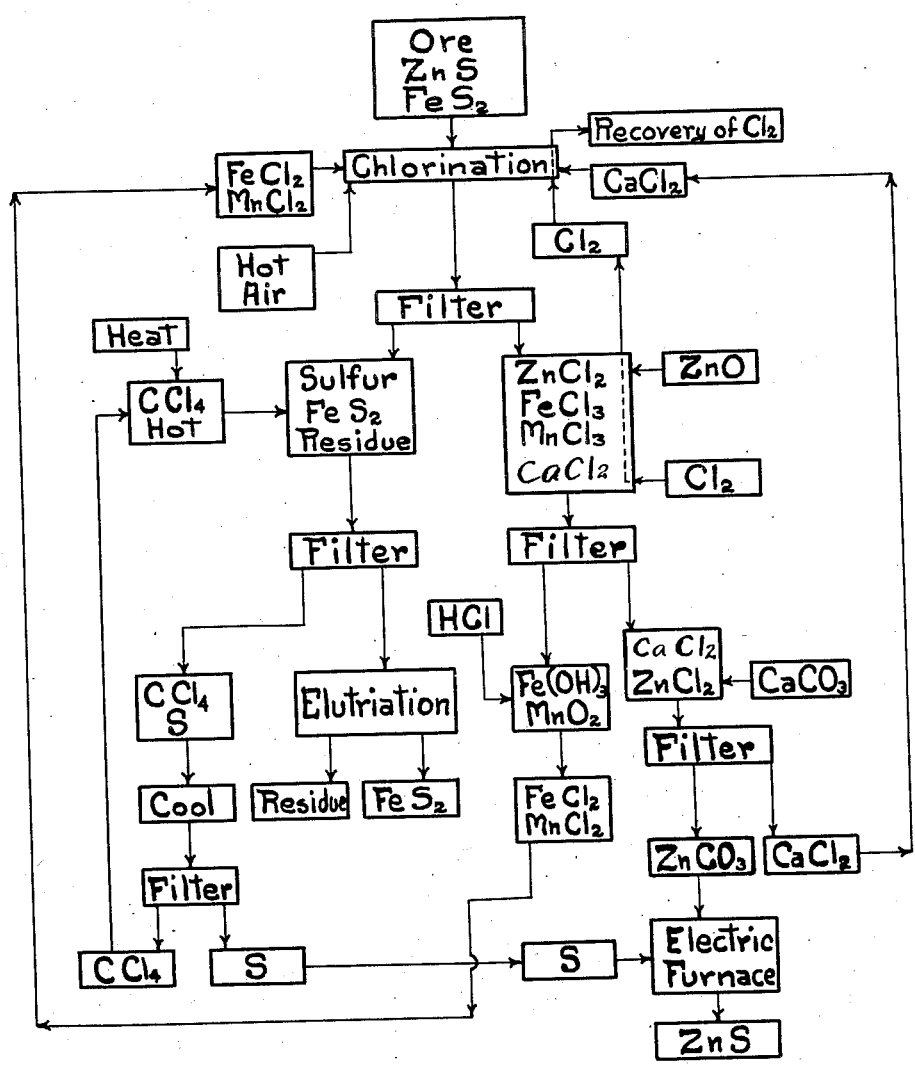
Witnesses
Harold W. Eaton
Avis D. Eaton
Inventor
Thomas A. Mitchell
By
Attorney Patented Dec. 29, 1931

1,838,857

UNITED STATES PATENT OFFICE

THOMAS AUSTIN MITCHELL, OF DENVER, COLORADO, ASSIGNOR TO LAFAYETTE M. HUGHES, OF DENVER, COLORADO

METHOD OF OBTAINING ZINC SULPHIDE FROM ITS ORE

Application filed April 6, 1927. Serial No. 181,609.

This invention relates to the treatment of sulphide ores and more particularly to a method of recovering zinc sulphide from an impure ore.

The valuable metals are often found as sulphides in complex ores, and in the treatment of such ores in accordance with the usual practice, which involves a roasting operation, the sulphur is burned and is ordinarily permitted to pass into the outside atmosphere and be wasted, thus causing a considerable economic loss. Iron sulphide or pyrites is commonly present in such ores along with the other metal sulphides, and this compound is of value to the manufacturers of sulphuric acid, although this source of sulphur has heretofore been largely ignored. There, however, is too little of this compound in the ordinary ore to make it economically feasible to treat the ore merely to obtain the pyrites. On the other hand, the total sulphur content of the ore is high and its recovery is highly desirable. As a further consideration the valuable ores, such as zinc sulphide, are commonly found associated with iron pyrites, quartz and other undesirable impurities, and the purification or recovery of such metal compounds presents many problems, hence zinc sulphide, for example, is expensive and not easily obtained, in spite of the fact that this is the form in which the zinc occurs in nature.

It is accordingly the primary object of this invention to provide a method of so treating an ore containing zinc sulphide and other materials, such as iron sulphide, as to obtain a pure zinc sulphide therefrom.

A further object is to utilize the sulphur content of the ore in this process and to separate both the zinc and the sulphur components originally in the ore and then recombine them to form a pure zinc sulphide.

Further objects, which will be apparent in the following disclosure, involve providing a process of treating such ores which is simple, economical and largely cyclic in its operation, and may be so carried on that materials recovered at one stage may serve as reagents at other stages.

In accordance with my invention, I treat the sulphite ore directly in an aqueous bath with a chloride of a metal capable of reducing to a lower valence and of reacting with the sulphide of zinc to form a chloride thereof. The preferred reagents for this purpose are manganic and ferric chlorides, since they will not attack the iron sulphide present to any large extent under the preferred conditions of the process. Manganic chloride is particularly serviceable since it attacks the ore metal sulphides of zinc, lead and the like rapidly and with a considerable evolution of heat. Owing to the fact that both iron and manganese compounds are found together in many ores, I prefer to use them together, for economic reasons. The reactions proceed in accordance with the following formulas:—

$$ZnS + 2FeCl_3 = ZnCl_2 + 2FeCl_2 + S$$
$$ZnS + 2MnCl_3 = ZnCl_2 + 2MnCl_2 + S$$

In order that the process may proceed continuously, I propose to oxidize the ferrous and manganous chlorides formed during the process and preferably in the digesting bath, during the chlorinating action. The preferred reagent for this purpose is one capable of providing nascent or free chlorine. Chlorine gas bubbled through the reacting mixture of ore and chlorides serves well for this purpose, and it is found that the chlorine will not attack the iron sulphide to any great extent in the presence of other sulphides, such as zinc sulphide, and particularly in a concentrated chloride solution.

The reaction betwen the metal sulphides and the chlorides results in the formation of free sulphur which is interspersed throughout the residue. If it is desired to separate the sulphur from the residue containing unattacked ore, pyrites, quartz, etc. it may be recovered by a cyclic operation comprising dissolving the sulphur, extracting it from the solvent and returning the latter for a further leaching operation. A reagent particularly adapted for this purpose is carbon tetra-chloride, which has the peculiar property of dissolving a considerable amount of sulphur when it is hot and of permitting it to precipitate when cooled.

The conversion of the ore to a chloride serves to eliminate the various impurities and leaves the zinc salt in solution in a recoverable form. This may be accomplished by filtration of the solution from the residue and precipitating a zinc compound therefrom by adding calcium carbonate, for example. Filtration separates zinc carbonate from the liquid and this may be reconverted to a sulphide by heating in an electric furnace with sulphur recovered from another stage of the process. In this way one may purify a zinc sulphide ore.

Referring more particularly to the drawing illustrating one arrangement of process steps which involve my invention, I have there illustrated the treatment of an ore, containing zinc and iron sulphides, as well as the usual impurities. It however will be readily understood that the treatment of more complex sulphide ores will proceed in accordance with the same principles, and the claims are to be interpreted accordingly. The ore may be suitably ground to a fine size, and then concentrated if desired. The finely ground ore or concentrates is then treated with the chlorinating agent, such as ferric and manganic chlorides in an aqueous bath, and preferably in the presence of an oxidizing agent capable of regenerating the ferrous and manganous chloride, formed by the chlorinating action, to the higher form for further treatment of the ore.

It is desirable that the bath be heated to aid in the chlorinating action, yet if the temperature is raised too high, this would result in melting or softening the sulphur to a thick viscous mass which would, to a large extent, float on the top of the bath and react with the chlorine. It would also coat the ore particles and prevent their being attacked by the reagents. It would also make a bad mess to handle. Hence, I have found it desirable to heat the bath to a temperature below the melting point of the sulphur and preferably just below the boiling point of the solution. This gives the heat desired for the reaction and yet prevents the sulphur from interfering with the chlorination process. Since the reaction takes place better in a concentrated solution, I also arrange the thermal supply in such a manner as not to dilute the solution to any material extent. This may be accomplished by steam jacketing the digesting tank, but to avoid the various problems inherent in this, I prefer to utilize hot air and to introduce the same directly into the bath. This thermal supply of air hastens the attack of the ore and keeps the particles of ore agitated and thus aids in the reaction. It will also be understood that heat is produced by the reaction of chlorine upon manganous chloride, and by the manganic chloride thus formed reacting upon the metallic sulphides of the ore, as well as the intimate reactions between the gaseous chlorine and the finely divided particles of the desired sulphides. The regulation of the bath temperature will be made by the air blown into it being given a temperature suitable for the purpose.

Therefore, after grinding the ore and concentrating it, if desired, I place it in a suitable digesting tank and there treat it with an aqueous solution of ferric and manganic chlorides while passing the hot air and chlorine gas through the batch. This is carried on until the zinc sulphide has been largely converted to a chloride and its sulphur set free. It is desirable not to continue the passage of the chlorine gas through the bath after the zinc sulphide has been converted to a chloride, since this might cause some of the iron sulphide to be attacked.

Since the temperature of the bath is kept at a comparatively low point, the sulphur remains suspended in the solution and mixed with the residue. When the reaction has been completed, the mass may be filtered. The residue contains pyrites, finely divided silica, and free sulphur interspersed throughout the mass.

It is to be noted that the iron sulphide in the ore will not be attacked or chlorinated to any considerable extent during a wet chlorination of the type described, hence it is possible to recover substantially all of the sulphur present in the ore. This selective chlorination action is based in part on the principle that the iron sulphide will not be converted to a chloride if a more easily attacked sulphide, such as zinc, lead or copper sulphide, is present. The ferric chloride will be reduced to ferrous chloride quite readily by zinc sulphide with the formation of zinc chloride. I have found that the higher the concentration of the zinc or other ore metal chloride, the less is the iron sulphide likely to be attacked. Incidentally, if too much chlorine gas is passed through the bath after the ore metal values have been largely chlorinated there will be some attack on the iron sulphide, hence the flow of chlorine should be regulated in accordance with the amount of ore sulphide left to be chlorinated. This concentration of chloride ions in the solution may be increased by the addition of calcium chloride or sodium chloride or other suitable material; if there is not enough of the ore metal chloride in the bath. This soluble salt incidentally serves as a carrier of chloride ions during subsequent stages of the process, if required for that purpose. In other words, the presence of the sulphides of zinc, etc. tends to lessen the attack on the iron pyrites, and as the concentration of the zinc and other ore metal chlorides increases, the solubility of iron sulphide, and even of the ferrous and ferric chlorides decreases. Hence to produce a solution low in soluble iron compounds, one should increase the concentration of the chlorides of the other metals, as by adding calcium chloride.

While various chemical reagents and solvents may be used for recovering the sulphur from the residue, I preferably employ a solvent therefor, and particularly one which may be reutilized in a cyclic manner for further leaching operations. To this end, I prefer to use carbon tetrachloride which has the property of dissolving sulphur in considerable amount while hot and of causing it to precipitate when cooled. Hence, the process involves simply leaching the residue with hot carbon tetrachloride in accordance with well known methods, and then cooling the solution to precipitate the sulphur. The sulphur crystals may then be separated from the solvent by filtration, after which they may be removed for further treatment or use as desired. The solvent is repeatedly heated and returned for further leaching operations, thus involving the minimum waste of reagent and expense.

The removal of the iron sulphide, or pyrite, from the residue of silica and the like may be accomplished by various methods. In the example given, the simple method of elutriation may be employed. This involves pumping the material tangentially into the bottom of a conically shaped vessel and causing the fines to pass over the top of the vessel with the major portion of the water, while the heavy pyrites settle and pass through a hole in the bottom of the cone. By such methods, the sulphur and the iron sulphide may be recovered and used as desired.

If the solution contains several metal salts, they may be separated in accordance with approved methods. In the example given, the solution contains manganese and iron chlorides with the zinc or other ore metal chlorides. These reagent salts may be removed by treating the mass with a reagent capable of precipitating insoluble compounds thereof without affecting the ore metal chlorides. This is preferably accomplished by means of an oxidizing agent such as calcium hypochlorite or chlorine with an oxide of a metal found in the ore, such as zinc oxide. Calcium hypochlorite is used if calcium chloride has been added to the digestion tank or if its presence at this stage is not detrimental. This may be done at any suitable stage in the process, such as immediately after the digestion of the ore, but I have shown it in the drawing as following the filtration of the chloride solution from the ore residue. This makes it easy to separate the reagents from the other materials for subsequent conversion to chlorides for reuse. This step is carried on simply by flowing the chloride solution into a suitable tank in which the zinc oxide has been placed, and chlorine gas is bubbled through the solution for a sufficient time and until the iron hydroxide and manganese dioxide have been fully precipitated. This precipitate may be filtered from the chloride solution and suitably converted to chlorides as by a proper treatment with hydrochloric acid and then returned to process to chlorinate further ore.

The primary purpose of my invention involves the purification and recovery of the zinc sulphide of the ore. This may be accomplished by treating the solution with calcium carbonate or other suitable reagent capable of precipitating a zinc salt from the solution. This results in the formation of insoluble zinc carbonate and leaves calcium chloride in solution. Filtering separates these. Incidentally, if calcium chloride was added to aid in keeping the iron sulphide from being chlorinated, it will stay with the solution, and the formation of further salt of this type by precipitating the zinc carbonate will have no undesired effects. In order to obtain a pure zinc sulphide, the zinc carbonate may be roasted in a furnace with some of the sulphur recovered during the process, and zinc sulphide will fume off. By this method, I first separate the zinc and the sulphur of the original sulphide ore, and after purifying each, I recombine them. It will be understood that other suitable zinc compounds may be formed in place of the zinc carbonate, and various methods employed for recombining the sulphur with the zinc, within the scope of my invention.

By this method, it will therefore be seen that I have made it feasible to recover not only the valuable metal products of a sulphide ore, but the large amount of sulphur which is present in the ore. The process is simple and it is efficient and economical in its operation, since the ingredients used for the reagents may be repeatedly used. The carbon tetrachloride solvent is returned to leach further masses of residue repeatedly, and the ferric and manganese chlorides originally used to break down the sulphide ore may be obtained from the ore as will be understood by one skilled in the art. Moreover, the process may be made cyclic by returning the chlorine to the digesting tank by employing a suitable method for recovering it from the final solution of calcium chloride. It will also be understood that by continuously regenerating the ferrous and manganous chlorides to the higher condition it is made possible for me to employ but a small amount of chlorinating reagents, and have a low concentration thereof. This is an important feature of my invention. Reference is to be had to my Patents No. 1,736,659 and No. 1,736,660 for a further description of other features of this process which are not specifically claimed herein.

Having thus described my invention, what

I claim as new and desire to secure by Letters Patent is:—

1. The method of recovering values from an ore containing zinc and iron sulphides, comprising the steps of chlorinating the ore in an aqueous bath with chlorine gas and a solution containing a variable valent metal chloride capable of forming zinc chloride and free sulphur, carrying on the reaction in the presence of sufficient calcium chloride to provide a high concentration of chloride ions and maintaining conditions in the bath to minimize the attack on the iron sulphide and to form non-plastic sulphur, precipitating and separating the iron from the solution, forming a zinc oxygen compound from the solution and thereafter heating said compound with sulphur to form zinc sulphide.

2. The method of treating a complex ore containing the sulphides of iron and zinc comprising the steps of chlorinating the ore in an aqueous bath of a variable valent metal chloride solution and chlorine gas which are capable of forming zinc chloride and free sulphur, carrying on the reaction in the presence of sufficient calcium chloride to provide a high concentration of chloride ions while maintaining conditions in the bath to minimize the attack on the iron sulphide and to form non-plastic sulphur, separating the zinc chloride solution from the residue, treating the solution to form a zinc oxygen compound, recovering sulphur from the residue and subsequently heating said compound and the sulphur to form zinc sulphide.

3. The method of treating an ore containing iron and zinc sulphides comprising the steps of chlorinating the ore with chlorine in an aqueous bath of a variable valent metal chloride and a sufficient amount of a constant valent metal chloride to provide a high concentration of chloride ions so as to form zinc chloride and non-plastic sulphur and to minimize the attack on the iron sulphide, separating the zinc chloride solution from the residue of sulphur and the iron content, recovering sulphur from the residue, converting the zinc chloride to a zinc compound capable of reacting with sulphur to form zinc sulphide and thereafter heating the sulphur and the zinc compound to form zinc sulphide.

4. The method of treating an ore containing iron and zinc sulphides comprising the steps of chlorinating the ore in an aqueous bath of a variable valent metal chloride and sufficient calcium chloride to provide a high concentration of chloride ions while introducing chlorine into the bath so as to form zinc chloride and non-plastic sulphur and to minimize the attack on the iron sulphide, separating the zinc chloride solution from the residue of sulphur and the iron content, converting the zinc chloride to a zinc compound capable of reacting with sulphur to form zinc sulphide and thereafter heating sulphur and the zinc compound to form zinc sulphide.

5. The method of obtaining zinc sulphide from an ore containing zinc sulphide comprising the steps of chlorinating the ore in the presence of chlorine in an aqueous bath of a chloride of a metal capable of reducing in valency and sufficient calcium chloride to provide a high concentration of chloride ions so as to form a solution containing calcium and zinc chlorides, removing the residue, treating said solution with calcium carbonate to precipitate zinc carbonate, recovering the zinc carbonate and thereafter heating it with sulphur to form zinc sulphide.

6. The method of obtaining zinc sulphide from an ore containing zinc sulphide comprising the steps of chlorinating the ore in the presence of chlorine in an aqueous bath of ferric chloride and sufficient calcium chloride to provide a high concentration of chloride ions so as to form zinc chloride, separating the iron compounds and residue from the solution of zinc and calcium chlorides, treating the solution to form a zinc oxygen compound, separating the calcium chloride solution therefrom and returning it for reuse, and thereafter heating the zinc oxygen compound with sulphur to form zinc sulphide.

Signed at Newark, N. J., this 31st day of March, 1927.

THOMAS AUSTIN MITCHELL.